United States Patent

[11] 3,626,884

| [72] | Inventor | Joseph R. Annibale<br>Fairfax, Va. |
|---|---|---|
| [21] | Appl. No. | 61,956 |
| [22] | Filed | Aug. 7, 1970 |
| [45] | Patented | Dec. 14, 1971 |
| [73] | Assignee | The United States of America as represented by the Secretary of the Navy |

[54] LANDING AID ALIGNMENT MAST
5 Claims, 7 Drawing Figs.

| [52] | U.S. Cl. | 114/43.5 |
|---|---|---|
| [51] | Int. Cl. | B63b 35/44 |
| [50] | Field of Search | 114/0.5 R, 43.5; 248/43; 244/114 |

[56] References Cited
UNITED STATES PATENTS

| 3,279,406 | 10/1966 | Ricketts et al. | 114/43.5 |
| 3,487,553 | 1/1970 | Stingl | 114/43.5 X |

Primary Examiner—Trygve M. Blix
Attorneys—R. S. Sciascia and Q. E. Hodges

ABSTRACT: A pivoting mast which may be quickly raised or lowered and which has means for separating the mast from the pivoting support in cases of an emergency. The mast support structure is capable of supporting a mast structure heavy enough to have a natural frequency outside the range of ship's vibrations and capable of erecting the mast and holding it in its erected position within narrow tolerances so the landing aids may be critically aligned.

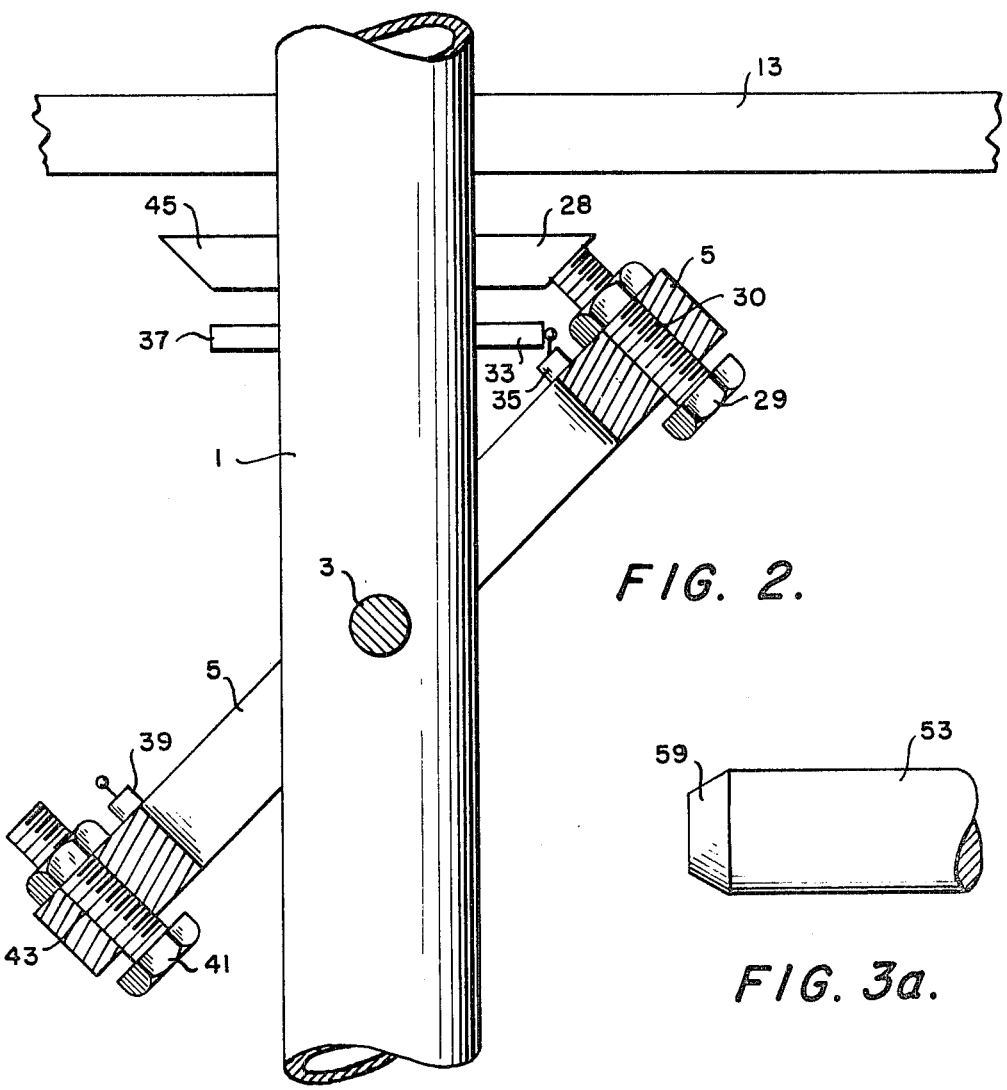
FIG. 2.
FIG. 3a.
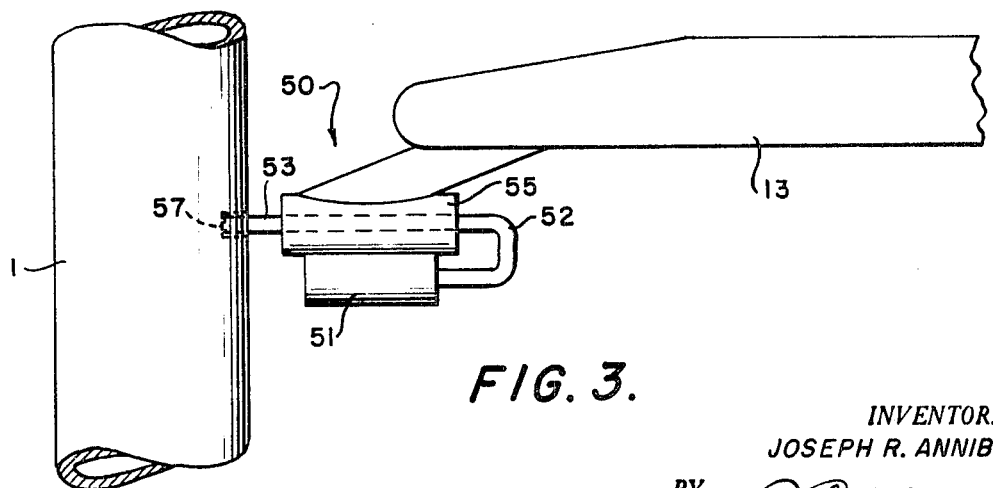
FIG. 3.
INVENTOR.
JOSEPH R. ANNIBALE
BY
ATTORNEY

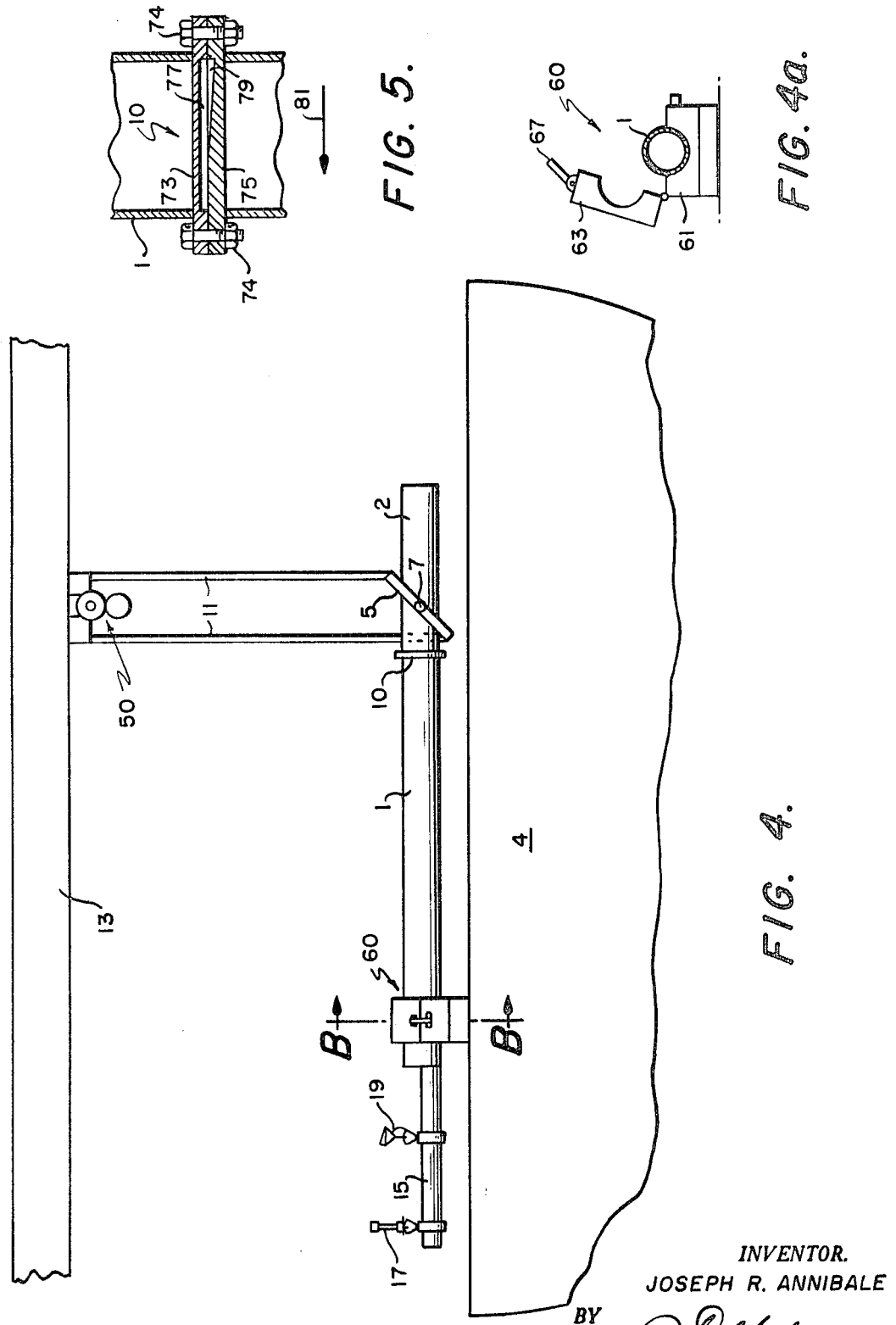

LANDING AID ALIGNMENT MAST

The invention described herein may be manufactured and used by or for the Government of the United States of America for Governmental purposes without the payment of any royalties thereon or therefor.

BACKGROUND AND SUMMARY OF THE INVENTION

Means exist in the prior art for power driven means for erecting masts. The prior art is limited to mast mounting devices which require the mast be manually decoupled from its mounting position or in the case of a power operated mast erecting mechanism is limited to light weight mast systems, not requiring the erect mast be held within narrow tolerances. Nor does the prior art show a mast erecting system capable of erecting a mast which is heavy enough to be outside the range of the natural vibrations of a ship underway, such as an aircraft carrier.

This invention relates to a means for mounting a critically aligned mast so it may be stored below a carrier deck, near the transom and when needed may be erected to a vertical position and which will hold the mast in precise alignment so that fixtures attached thereto may be used to align the precise landing equipment onboard. In addition, this mounting system is capable of handling a mast having a sufficiently massive structure to be outside the range of an aircraft carrier ship's vibrations so the natural vibrations of the ship are not imparted to the mast, destroying its alignment. It also has a capability for emergency jettison so that when the mast is in a vertical position, the antenna may be quickly jettisoned from the mount aft of the stern. Furthermore, this mast has a manual erection and retraction capability.

Mounted at the top most end of the erect mast is a mirror and a radar reflector. The mirror is used to align the ship's fresnel lens optical landing system and the radar reflector is used to align the ship's landing radar system. The mirror is at the precise point of the pilot's eye when the aircraft is in the landing glide path and when the lens optical landing system is properly aligned with respect to the mirror on the mast, the beam of the optical landing system light will be directly in the eye of the pilot when he is in the glide path. Similarly, the landing radar system when aligned with the radar reflector on the mast will be precisely aligned with the aircraft radar reflector when that aircraft is in the glide path of the aircraft carrier.

BRIEF DESCRIPTION OF THE DRAWINGS

FIG. 2 shows a detail of the mast hinge point and the positive stops, switches and actuators.

FIG. 3 shows the pin means for locking and holding the mast in a vertical position. FIG. 3a is a detail of the pin structure of FIG. 3.

FIG. 4 shows the mast in retracted position below the flight deck from the stern.

FIG. 4a is a detail of the clamp shown in FIG. 4.

FIG. 5 is a detail of the separation flange joint showing the biased explosive holding groove.

DESCRIPTION OF THE PREFERRED EMBODIMENT

Figure 1:
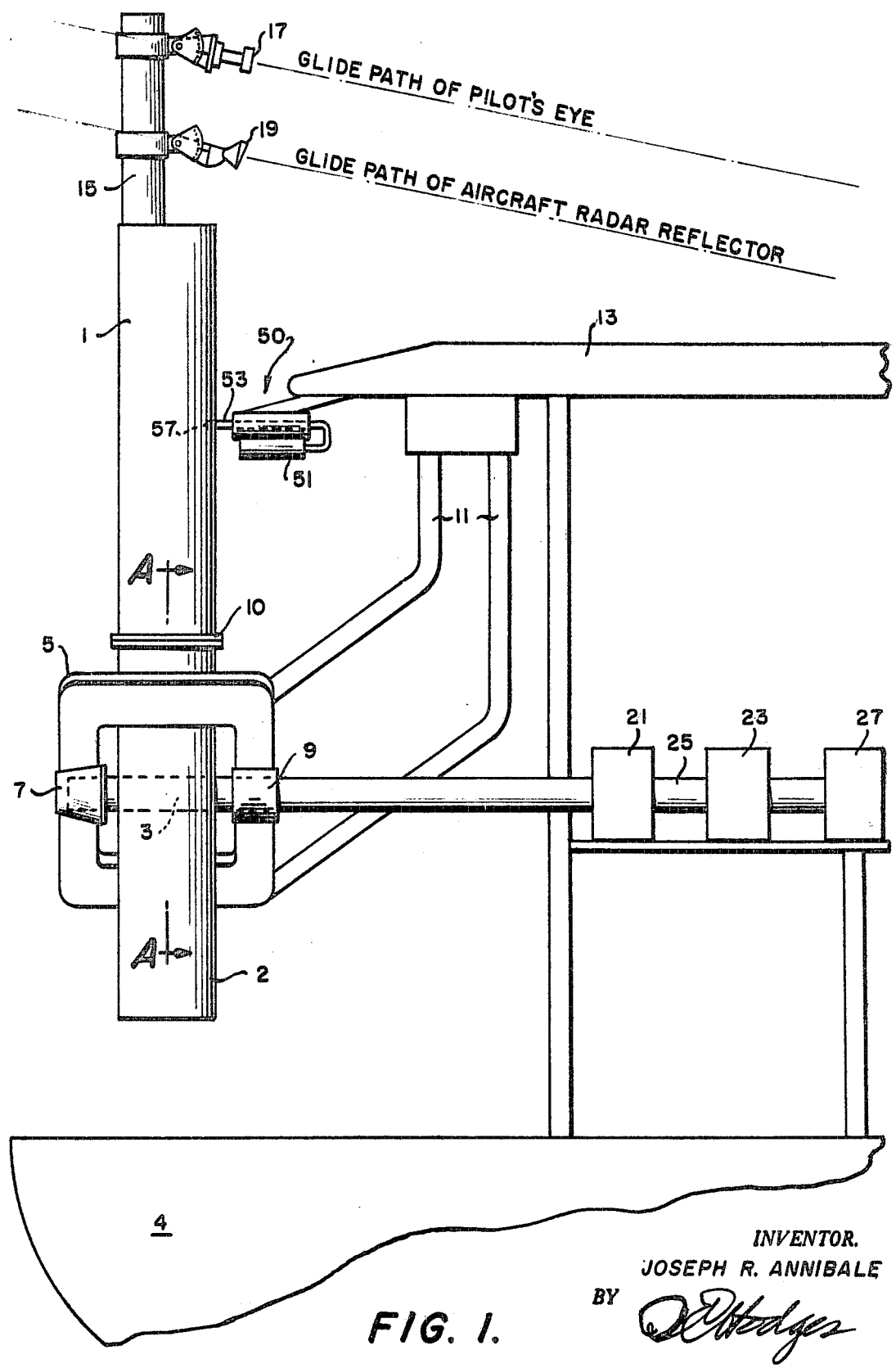
FIG. 1 is a drawing of the mast mounted on the aft end of the aircraft carrier flight deck and in vertical position.

Referring now to FIG. 1 the main mast 1 is seen in a vertical position above the ship's stern 4. A suitable vibration free alignment mast is of four sides, each side measuring 4 feet and made of one-half inch steel plate. The mast is supported by shaft 3 extended through the mast and through yoke 5 at hinge point bearings 7 and 9. Yoke 5 is rigidly attached to yoke support mounting 11, which in turn is rigidly attached to the flight deck 13. Attached to the main mast 1 is a counterweight 2 which balances mast 1 about the hinge shaft 3. Pin 53 of pin assembly 50 is inserted in a mating hole 57 in mast 1 and holds the mast in vertical alignment. On top of the main mast 1 is a topping mast 15 which supports the mirror reflector 17 and the aircraft radar reflector 19, both mirror and radar reflector are aligned in the glide path of the landing aircraft.

Shaft 3 extends through bearing 9 and is integral with gear reducer 21. Electric motor 23 drives gear reducer 21 through drive shaft 25. Motor 23 is attached to the ship's electrical system. The motor and gear reducer may be any suitable means adapted to this application. Motor 21 is provided with an adapter 27 on its drive shaft 25 through which auxiliary power means may be attached, such as a hand crank or an air or hydraulic motor, to turn drive shaft 25 should the electrical power fail. Flange 10 is located at the explosive separation point and contains sufficient explosive which, when detonated, will separate the main mast 1 from the hinge joint and jettison that portion of the mast, aft of the ship.

Referring now to FIG. 2 is shown in detail the yoke 5 taken through section A—A. Positive vertical stop 28 is rigidly affixed to the mast and cooperates with threaded bolt stop 29, threadedly held in yoke 5 at 30. Stop 29 may be adjusted to hold the mast in the desired vertical position. Cam 33 located on the mast cooperates with switch 35 located on the yoke so that when the mast arrives at a point close to its erect position, it opens switch 35 to deenergize motor 23, thus allowing the motor's frictional forces serve to deaccelerate the motion of the mast as it arrives at its erect position to facilitate accurate mast positioning. Similarly cam 37 located on the mast cooperates with switch 39 to deactivate motor 21 when the mast comes to its stowed position parallel to the flight deck. A threaded rod 41, threadedly fitted into the yoke at 43, cooperates with positive stop 45 on the mast to positively stop the mast at its retracted position.

Referring now to FIG. 3 wherein is shown the hydraulically actuated pin assembly 50 having hydraulic actuator cylinder 51 connected to an end 52 of pin 53. Pin 53 slides within pin housing 55 and fits into a mated receiving hole 57 located in mast 1. Suitable circuitry connects switch 35 to pin assembly 50 so that as the mast comes to full vertical position, hydraulic cylinder 51 is actuated inserting pin 53 in mast receiving hole 57 and firmly locking the mast in its vertical position to within 3 minutes of a degree.

FIG. 3a shows a detail of pin 53 and receiving hole 57. Pin 53 is of cylinder cross section with a tapered nose section 59 to facilitate insertion within mast receiving hole 57 and to cause by a camming action the accurate positioning of the mast.

FIG. 4 shows a mast in stowed position parallel to the flight deck 13. Clamp 60, shown through section B—B in FIG. 4a is a manual clamp having a rest stop 61 and a top clamp 63 and with a locking bolt 67 to lock the clamp and hold the mast firmly in place.

Referring now to FIG. 5 wherein is seen explosive flange 10 at the explosive separation point. Flange 10 is composed of two symmetrical halves 73 and 75 joined by explosive bolts 74. A groove 77 is machined in flange half 73 at its mating surface and a second groove 79 is machined in flange 75 at its mating surface. Groove 77 is equal depth throughout the flange but groove 79 is biased to be deepest at one point on the flange gradually becoming shallower as the groove progress circumferentially from its deepest point to two points 90° apart from the point of maximum groove depth. When the explosive in the biased groove is detonated the explosive force will push the mast clear of the ship in a direction shown by arrow 81.

Obviously many modifications and variations of the present invention are possible in the light of the above teachings. It is therefore to be understood that within the scope of the appended claims the invention may be practiced otherwise than as specifically described.

What is claimed is:

1. A system for aligning the optical and electronic landing aides on an aircraft carrier, and which can be placed in the aircraft glide path for alignment operations and in a stowed position, clear of the landing aircraft glide path when not used, comprising:

means for mounting optic and radar reflectors;
said mounting means isolating said optic and radar reflectors from the ship's vibrations;

said mounting means having a pin receiving means;
pivot means
counterbalancing means;
said pivot means attached to said mounting means whereby said mounting means rotates about said pivot means in a plane parallel to the stern of the aircraft carrier;
means supporting said pivot means;
said counterbalancing means attached to said mounting means and separated from said mounting means by said pivot means;
position sensing means;
pin means;
signal generating means;
said position sensing means connected to said signal generating means and actuating said signal generating means when said support means is rotated approximately to its alignment position within the aircraft glide path; and
said pin means actuated by a signal from said signal generating means and cooperating with said pin receiving means in said mounting means to lock said mounting means within its alignment position.

2. The system of claim 1 wherein said support means is a yoke permanently affixed to the ship structure;
said yoke having bearing means;
said pivot means is a shaft extending through said bearing means and supporting said mounting means for pivoting movement; and
said shaft being connected to a means for rotating said shaft.

3. The system of claim 2 wherein said mounting means includes a first cam and a second cam;
said yoke including a first and second switch connected to said means for rotating said shaft;
said first cam cooperating with said first switch located on said yoke whereby said cam trips the first switch when the mounting means is substantially close to its alignment position;
said second switch being on the side of the yoke opposite the first switch whereby said second cam cooperating with said second switch trips said second switch when said mounting means is substantially close to full retracted position; and
said yoke further including the first positive stop means threadedly inserted on said yoke and cooperating with said mounting means to positively stop the travel of said mounting means when said mounting means is rotated to its alignment position.

4. The system of claim 3 wherein said pin means is actuated by said first switch means to engage said mounting means and lock said mounting means within 3° of arc; and
said pin means being tapered at its point of engagement with said mounting means whereby said pin positions said mounting means in its alignment position as the pin engages said mast.

5. The system of claim 4 wherein said mounting means includes an explosive separation point and is separable at its explosive separation point into first and second separable parts;
a flange joining said mounting means at its explosive separation point and having a first and second half;
said first half of said flange surrounding the first of said separable mounting means parts and attached to said first mounting means part;
said second half of said flange surrounding the second of said separable mounting means parts and attached to said second separable part of said mounting means part;
said flange having explosive bolts;
said first and said second flange halves being joined by said explosive bolts through said first and second halves of said flange;
said bolts being parallel to the axis of said mounting means;
said flange having a machine groove in said first and second halves;
said groove in said first flange half being of uniform depth;
said groove in said second flange half being of nonuniform depth; and
said groove in said second flange half being biased.

* * * * *